(12) United States Patent
Li et al.

(10) Patent No.: US 11,572,077 B2
(45) Date of Patent: Feb. 7, 2023

(54) METHOD FOR DISTRIBUTED DATA ANALYSIS

(71) Applicant: Nauto, Inc., Palo Alto, CA (US)

(72) Inventors: Ming Li, Palo Alto, CA (US); Suchitra Sathyanarayana, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 197 days.

(21) Appl. No.: 16/502,447

(22) Filed: Jul. 3, 2019

(65) Prior Publication Data

US 2020/0010093 A1    Jan. 9, 2020

Related U.S. Application Data

(60) Provisional application No. 62/694,295, filed on Jul. 5, 2018.

(51) Int. Cl.
*B60W 50/00* (2006.01)
*G05B 17/02* (2006.01)
*G07C 5/08* (2006.01)
*B60W 30/18* (2012.01)
*G07C 5/00* (2006.01)

(52) U.S. Cl.
CPC ............ *B60W 50/00* (2013.01); *B60W 30/18* (2013.01); *G05B 17/02* (2013.01); *G07C 5/008* (2013.01); *G07C 5/085* (2013.01); *B60W 2050/0031* (2013.01); *B60W 2050/0083* (2013.01)

(58) Field of Classification Search
CPC ................. B60W 50/00; B60W 30/18; B60W 2050/0083; B60W 2050/0031; B60W 2050/0028; B60W 2556/45; B60W 2540/00; B60W 2555/00; B60W 40/02; G05B 17/02; G07C 5/085; G07C 5/008
See application file for complete search history.

(56) References Cited

U.S. PATENT DOCUMENTS

| | | | |
|---|---|---|---|
| 8,930,072 B1 * | 1/2015 | Lambert | ................. B60R 1/00 701/36 |
| 9,358,926 B2 * | 6/2016 | Lambert | ................. B60R 1/02 |
| 10,719,899 B1 * | 7/2020 | Dabell | ............ G06F 16/90335 |
| 2015/0278206 A1 * | 10/2015 | Lytell | .................... G06F 21/64 348/231.6 |

(Continued)

*Primary Examiner* — James J Lee
*Assistant Examiner* — Alexander George Matta
(74) *Attorney, Agent, or Firm* — Vista IP Law Group, LLP

(57) ABSTRACT

The present disclosure relates to techniques to implement a vehicle action using a distributed model distributed across the vehicle and a remote node. A local portion of the distributed model at the vehicle may generate a local output model based on vehicle event data collected at the vehicle. The local output model may be sent from the vehicle at a first location to the remote node at a second location. The remote node may generate a remote output model based on the local output model using the remote portion of the distributed model. The vehicle action may be determined based on inspecting a reconstructed version of the vehicle event data included in the remote output model. The determined vehicle action may be implemented at the vehicle. The distributed model may facilitate the transmission of vehicle event data across multiple locations while securing the transmission of personally-identifiable information.

23 Claims, 7 Drawing Sheets

(56) References Cited

U.S. PATENT DOCUMENTS

| | | | |
|---|---|---|---|
| 2015/0363655 A1* | 12/2015 | Artan | G06K 9/00838 |
| | | | 382/103 |
| 2017/0054689 A1* | 2/2017 | Hughes | H04L 63/0281 |
| 2018/0032908 A1* | 2/2018 | Nagaraju | G06F 11/30 |
| 2018/0046869 A1* | 2/2018 | Cordell | G06K 9/00845 |
| 2019/0385023 A1* | 12/2019 | Li | G06K 9/56 |
| 2021/0192867 A1* | 6/2021 | Fang | G07C 5/008 |

* cited by examiner

METHOD FOR DISTRIBUTED DATA ANALYSIS

CROSS-REFERENCE TO RELATED APPLICATION

This application claims priority to U.S. provisional patent application Ser. No. 62/694,295 filed Jul. 5, 2018, and titled "METHOD FOR DISTRIBUTED DATA ANALYSIS," which is incorporated herein in its entirety by this reference thereto.

TECHNICAL FIELD

This disclosure relates to data analysis, and, in particular, to distributed vehicle data analysis.

BACKGROUND

Many vehicles and vehicle systems may implement automotive data collection and analysis components to gather and inspect data relating to the vehicle. For example, in an autonomous vehicle system, the vehicle system may include a plurality of sensors gathering information relating to the environment inside and outside of the vehicle. The vehicle system may inspect the gathered information in order to perform an action (e.g., turn the vehicle to avoid an object).

Information gathered in a vehicle system may be aggregated to facilitate analysis of the data and the production of data-driven models. In many cases, received information from multiple jurisdictions/geographic locations may be transmitted to a central location, and the received information may be aggregated at the central location to produce the data-driven models. These data-driven models can identify the information depicted in the data and can assist in determining a vehicle action to take.

In many cases, vehicle systems may gather information that may be indicative of an individual or individuals. For example, a vehicle system may gather image(s) of individuals from one or more vehicle-associated image sensors or metadata associated with a vehicle operator/passenger. Further, many jurisdictions may limit the type and extent of personally-identifiable information that can be transferred within and/or outside of such jurisdictions in order to protect the privacy of individuals.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
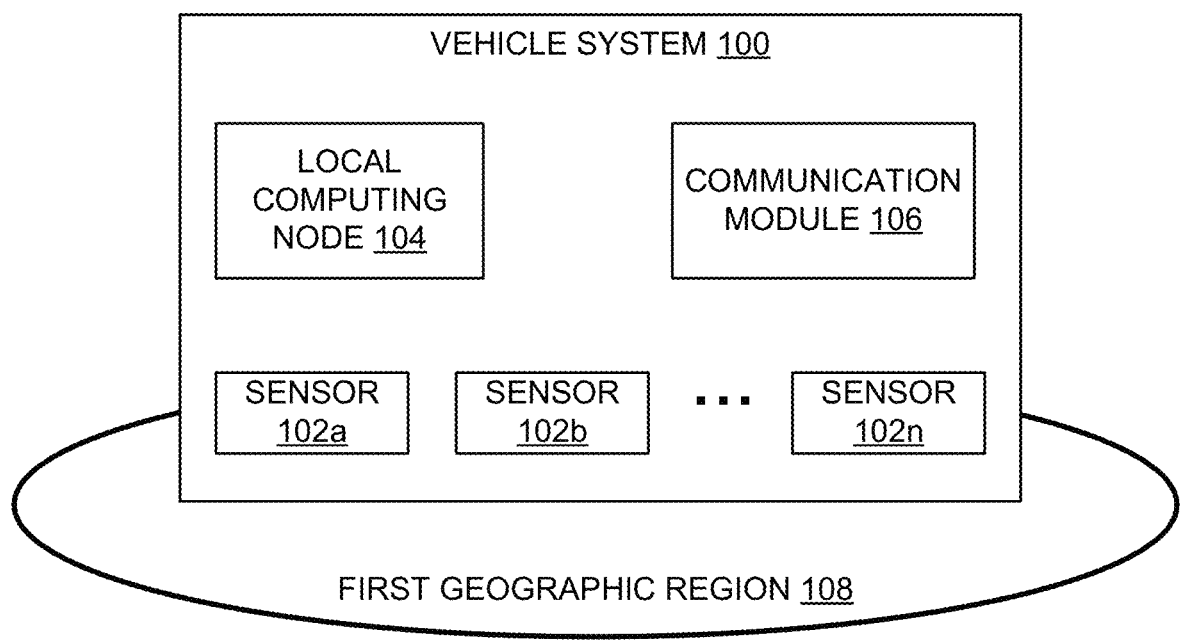
FIG. 1 illustrates a block diagram of a vehicle system in a first geographic location, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

Embodiments may be described with reference to particular computer programs, system configurations, networks, etc. However, those skilled in the art will recognize that these features are equally applicable to other computer program types, system configurations, network types, etc. For example, although the term "Wi-Fi network" may be used to describe a network, the relevant embodiment could be deployed in another type of network.

Moreover, the disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

Terminology

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, may refer to any connection or coupling, either direct or indirect, between two or more elements. The coupling or connection between the elements can be physical, logical, or a combination thereof.

References to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Overview

A vehicle system may include a plurality of sensors that may gather various types of information relating to the environment around the vehicle. For example, the system may include one or more image sensors that capture images of an interior or exterior of the vehicle. The gathered information may be inspected to determine an action for the vehicle to take (e.g., change speeds, turn the vehicle). As an example, the sensors may detect an object in the path of the vehicle system, and the vehicle system may take avoidance measures to avoid colliding with the object.

Information gathered in a vehicle system may be aggregated to facilitate analysis of the data and the production of data-driven models. In many cases, received information from multiple jurisdictions/geographic locations may be transmitted to a central location, and the received information may be aggregated at the central location to produce the data-driven models. Data-driven models may be utilized in classifying the received data determining a vehicle action to take based on the elements included in the received data.

In many cases, vehicle systems may gather personally-identifiable information that may be indicative of an individual or individuals. For example, a vehicle system may gather image(s) of individuals from one or more vehicle-associated image sensors or metadata associated with a vehicle operator/passenger.

Many jurisdictions may limit the type and extent of personally-identifiable information that can be transferred out of such jurisdictions in order to protect the privacy of individuals. For example, a jurisdiction may not allow an unencrypted image of an individual to be transmitted over a network (e.g., a cellular network), as the unencrypted image may be intercepted and reconstructed to identify the individual depicted in the image.

It may be desirable to utilize aggregated data from several geographic locations and jurisdictions in a centralized location to facilitate analysis of the data and the production of data-driven models without contravening limitations on PII transfer.

System Overview

The present embodiments relate to processing vehicle event data both locally and remotely to produce output models using a distributed model to perform vehicle-related actions without contravening limitations on PII transfer. Vehicle event data may be collected locally in a first geographic location. The vehicle event data may be processed using a local portion of a distributed model to produce local output models. The local output models may include a modified version of the vehicle event data that may prevent unauthorized entities from reconstructing the vehicle event data to reveal personally-identifiable information (PII).

The local output models may be transmitted to a remote node at a second geographic location. The remote node may process the local output model using a remote portion of the distributed model to produce a remote output model. Using the distributed model, the remote output model may allow for the remote node to reconstruct the vehicle event data. A vehicle-related action may be implemented based on the vehicle event data identified from the remote output models.

The system may implement machine-learning models (convolutional neural networks, deep learning models, etc.) that may be trained based on vehicle event data collected in multiple geographic locations without transmitting unsecured PII across the geographic locations. For example, data collected in a first geographic location (e.g., a state, country) that includes PII can be processed to generate a local output models that can only be reconstructed by a remote node that includes a remote portion of the distributed model. In other words, the local output models may prevent unauthorized entities from reconstructing the PII (e.g., by reverse-processing, inverting the processing procedure). Accordingly, the local output models may be transmitted out of the jurisdiction associated with the first location to a second geographic location for aggregation at a second location, wherein training can be performed at the second location.

In some embodiments, the location-specific models generated from the distributed model may be locally and/or remotely trained. The distributed model can include a plurality of local portions, wherein each of the plurality of local portions may be associated with a specific location and may be interconnected (e.g., via outputs of synthetic neurons of the local portions of the distributed model) to a single remote portion of the distributed model. The distributed model can include a remote portion and a local portion associated with a single geographic location so specificity is preserved at both the local and remote portions of the distributed model. Location-specific training may enable the local/remote models to be trained to classify vehicle events that are specific to a single geographic location or subset of potential geographic locations (e.g., vehicle operating maneuvers specific to left-hand right-of-way countries, specific to right-hand right-of-way countries, country-specific traffic laws, jurisdiction-specific traffic laws).

FIG. 1 illustrates a block diagram of a vehicle system 100 in a first geographic location, in accordance with various embodiments. The vehicle system 100 may comprise a vehicle, such as an automobile, truck, airplane, boat, etc.

The vehicle system 100 may incorporate a plurality of sensors 102*a-n*. Sensors 102*a-n* may gather various types of information relating to the environment within and/or outside of the vehicle. The sensors 102*a-n* can include: cameras (e.g., wide angle, narrow angle, visible range, invisible range, infrared (IR), multispectral, hyperspectral, monocular, stereoscopic, etc.), kinematic sensors (e.g., accelerometers, inertial measurement units (IMUs), gyroscopes, etc.), optical systems (e.g., ambient light sensors), acoustic systems (e.g., microphones, speakers, etc.), range-finding systems (e.g., radar, sonar, time of flight (TOF) systems, light imaging, detection, and ranging (LIDAR) systems, etc.), location systems (e.g., global positioning systems (GPS), cellular trilateration systems, short-range localization systems, dead-reckoning systems, etc.), temperature sensors, pressure sensors, proximity sensors (e.g., range-finding systems, short-range radios, etc.), or any other similar sensor type.

As noted below, sensors 102*a-n* can be disposed either interior of exterior of the vehicle. Sensors 102*a-n* can include any number of sensors of varying types in order to collect vehicle event data.

The collected vehicle event data may include personally-identifiable information (PII). PII can include any vehicle event data that can be used to determine the identity of an individual. Examples of PII can include information identifying: the driver of the host vehicle (e.g., the vehicle at which the vehicle event data is collected), drivers of secondary vehicles (e.g., vehicles operating in the vicinity of the host vehicle, vehicles in the vicinity of the host vehicle that are not operating), non-drivers (e.g., pedestrians in the vicinity of the host vehicle, passengers of the host vehicle and/or secondary vehicles, registered owners of the host vehicle and/or secondary vehicles, etc.), and any other suitable entity whose personal identity can be disclosed in and/or derived from the vehicle event data.

The vehicle event data may include PII image data that can comprise any of: face data (e.g., identifiable images of individuals' faces), license plate data (e.g., images of license plates from which the alphanumeric license plate code can be extracted), other vehicle metadata (e.g., images of VIN numbers, visible vehicle-specific features, etc.), images of private residences including identifying information (e.g., an address, identifying signage, etc.), and any other imagery from which PII can be determined and/or extracted. In some embodiments, PII in vehicle event data can include any of: voice data attributable to an individual (e.g., collected from a microphone of the onboard vehicle system), biometric data associated with an individual (e.g., fingerprint data, DNA information, face identification data, iris scans, etc.), and any other data usable to identify an individual. However, PII can include any other suitable information that could be used to identify a person.

The vehicle system 100 can include a local computing node 104. The local computing node 104 may include an on-board computation system that can collect vehicle event data received from sensors 102*a-n* and process the vehicle event data. Local computing node 104 may include at least one processor (e.g., a set of GPUs, CPUs, microprocessors, TPUs, etc.) and memory (e.g., RAM, Flash). In some embodiments, the local computing node 104 may include one or more interconnected computing devices (e.g., series of interconnected servers, cloud devices, etc.).

In some embodiments, at least a portion of the processing may be performed by a remote computing node (e.g., server, smartphone, etc.) external of the vehicle system 100. The local computing node 104 may sample any of the received vehicle event data (e.g., signals sampled by the sensors 102*a-n*), data from other vehicles (e.g., received from the source vehicle or a remote computing system), aggregate population data, historic data (e.g., for the vehicle, driver, geographic location, etc.), or another suitable source of data.

The local computing node 104 may process the received vehicle event data and generate local output models in real-or near-real time. The processing may be iteratively performed at a predetermined frequency (e.g., every millisecond, at a sampling frequency, etc.), or it may alternatively be performed in response to occurrence of a trigger event (e.g., change in the vehicle attitude, change in user distraction levels, receipt of driving session information, receipt of new sensor information, physical vehicle entry into a geographic region associated with high collision risk, object proximity detection, detection of an onset or end of a driving session, etc.), be performed a single time for a driving session, be performed a single time for the vehicle, or be performed at any other suitable frequency.

The local computing node 104 may sample one or more image streams (e.g., interior view image streams, exterior view image streams, etc.) from one or more cameras (e.g., still image cameras, video cameras, etc.) of the onboard vehicle system. This may include collecting any suitable type of data at any suitable sensor associated with the vehicle, either onboard or proximal the vehicle (e.g., vehicle-mounted sensors, sensors distributed along a roadway on which the host vehicle is traveling, etc.).

The vehicle system 100 can include a communication module 106. The communication module 106 can include any of: telemetry systems (e.g., for vehicle-to-vehicle, vehicle-to-infrastructure, vehicle-to-remote computing system, or other communications), wireless systems (e.g., cellular, Wi-Fi, a Institute of Electrical and Electronics Engineers (IEEE) 802.11x protocols, Bluetooth®, radio frequency (RF), near-field communication (NFC), etc.), wired systems (e.g., Ethernet, vehicle bus connections, etc.), or another suitable communication systems.

In some embodiments, the vehicle system may include a power system (e.g., battery, vehicle power connector, photovoltaic system, etc.).

As shown in FIG. 1, the vehicle system 100 may be within a first geographic region 108. A first geographic region 108 may include a defined geographic space (e.g., a state, country, county, jurisdiction, square-mile radius, etc.). The vehicle system 100 may be mobile and move within the first geographic location 108.

Figure 2:
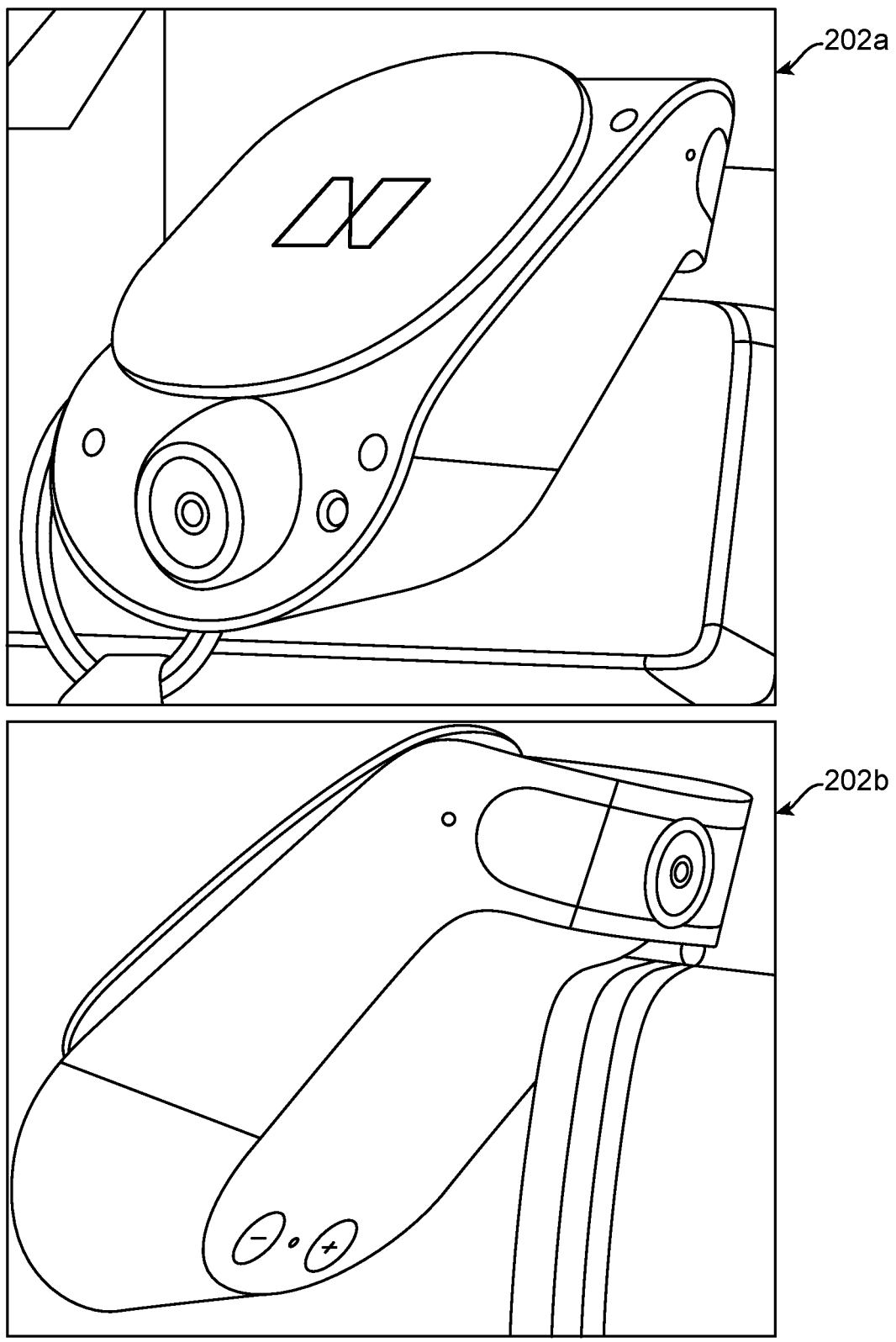
FIG. 2 illustrates an external and internal sensor, in accordance with various embodiments.

FIG. 2 illustrates an external and internal sensor, in accordance with various embodiments. As noted above, sensors 202*a-b* may collect vehicle event data relating to the environment of the vehicle system. In some embodiments, sensor 202*a* may include an external sensor external to the vehicle and configured to collect data of the environment outside of the vehicle, and sensor 202*b* may include an internal sensor internal to the vehicle and configured to collect data of the environment within the vehicle.

In some embodiments, vehicle system includes a set of internal sensors, a set of external sensors, and a processing system. The internal sensors (e.g., internal-facing camera, microphones, etc.) can be directed toward and monitor the vehicle interior, more preferably the driver volume but alternatively or additionally any suitable interior volume. The external sensors (e.g., exterior-facing camera) are preferably directed toward the vehicle exterior, more preferably toward a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle. The sensors may be statically mounted to the vehicle and/or each other, but can be movably mounted by a gimbal, damping system, or other motion mechanism.

The sensors may collect information representing vehicle event data. Examples of vehicle event data can include any of: vehicle operational data, driver behavior, vehicular traffic (e.g., near-miss or near-collision events, traffic operations such as merging into a lane, changing lanes, turning, obeying or disobeying traffic signals, etc.), data describing non-vehicular objects (e.g., pedestrian data such as location, pose, and/or heading; building locations and/or poses, etc.), environmental data (e.g., describing the surroundings of the vehicle, ambient light level, ambient temperature, etc.), etc.

Examples of driver and/or operator behavior data included in vehicle event data can include any of: operator profiles (e.g., history, driver score, etc.), operator behavior (e.g., user behavior), distraction level, expressions (e.g., surprise, anger, etc.), responses or actions (e.g., evasive maneuvers, swerving, hard braking, screaming, etc.), cognitive ability (e.g., consciousness), driving proficiency, willful behavior (e.g., determined from vehicle control input positions), attentiveness, gaze frequency or duration in a predetermined direction (e.g., forward direction), performance of secondary tasks (e.g., tasks unrelated to driving, such as talking on a cell phone or talking to a passenger, eating, etc.), or other behavior parameters; or any other suitable operator parameter, etc.

Figure 3:
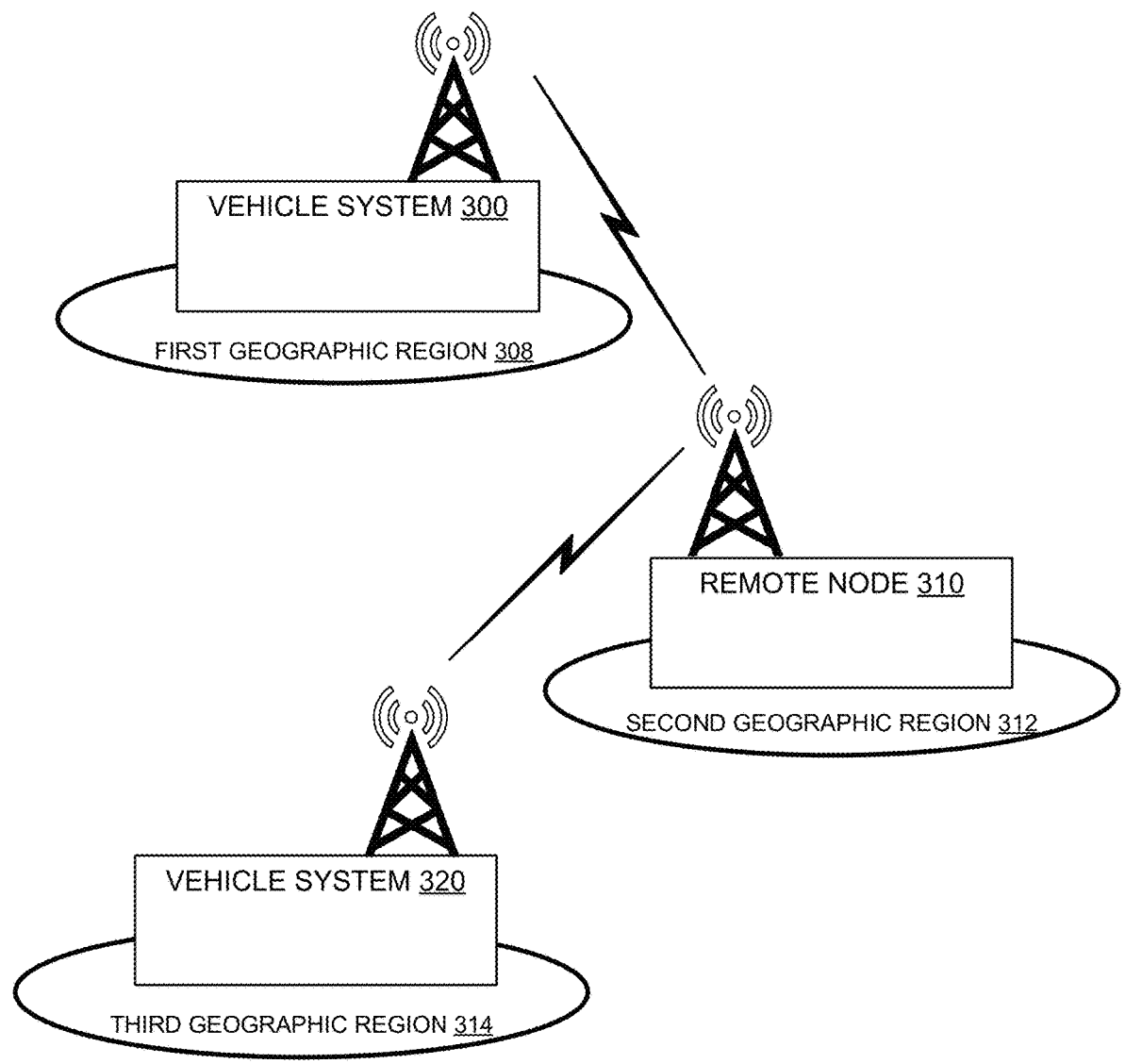
FIG. 3 illustrates a block diagram of a vehicle system configured to communicate with a remote node, in accordance with various embodiments.

FIG. 3 illustrates a block diagram of a vehicle system 300 configured to communicate with a remote node 310, in accordance with various embodiments. As noted above, vehicle system 300 can collect and process vehicle event data (i.e., data related to vehicle operation).

The vehicle system 300 in a first geographic region 308 may locally process the vehicle event data and generate local output models based on a distributed model, which is discussed in greater detail below. The vehicle system 300 may transmit the local output models to a remote node 310 via a suitable communication technique (e.g., a cellular network, Wi-Fi, the internet, ethernet, etc.). In some embodiments, the local output models may be communicated from the vehicle system 300 to the remote node 310 via one or more intermediary nodes (e.g., cellular towers, servers).

The remote node 310 may receive the local output models and process the local output models to generate remote output models using the distributed model, which is discussed in greater detail below. As shown in FIG. 3, the remote node 310 may be located within a second geographic region 312. The second geographic region 312 may be a defined geographic space that includes bounds that do not overlap with the first geographic region. As an example, the first geographic region 308 may include the country of France, and the second geographic region 312 may include the country of Germany. In some embodiments, the regions 308, 312 may be separated by a boundary (e.g., a national border, a predetermined boundary).

In many cases, a jurisdiction related to a geographic region (e.g., a country) may impose limitations on the transmission of PII within and/or outside of the bounds of the jurisdiction. As an example, a country may limit the transmission of an image depicting the face of an individual outside of the country.

However, vehicle event data may be collected and transmitted outside of a jurisdiction. For example, vehicle event data may be transmitted from vehicle system 100 at the first geographic region 308 to remote node 310 in the second geographic region 312. The remote node 310 may aggregate the vehicle event data in the second geographic region 312. Accordingly, the vehicle system 300 may inspect the vehicle event data and remove/modify any PII to remove the identifiable portions of the PII in accordance with any limitations imposed by the jurisdiction included in the first geographic region 308.

In some embodiments, the vehicle system 300 may send local model outputs to the remote node 310 across multiple geographic locations. For example, a first local output model may originate from a first geographic location and a second local output model may originate from a third geographic location, where each local output model may be sent to the remote node 310 at the second geographic location.

As shown in FIG. 3, the remote node 310 may communicate with a second vehicle system 320 in a third geographic region 314 different than any other geographic region 308, 312. The remote node 310 may aggregate vehicle event data received from multiple vehicle systems 300, 320 and train the remote portion of the distributed model based on the received vehicle event data.

Distributed Model

Figure 4:
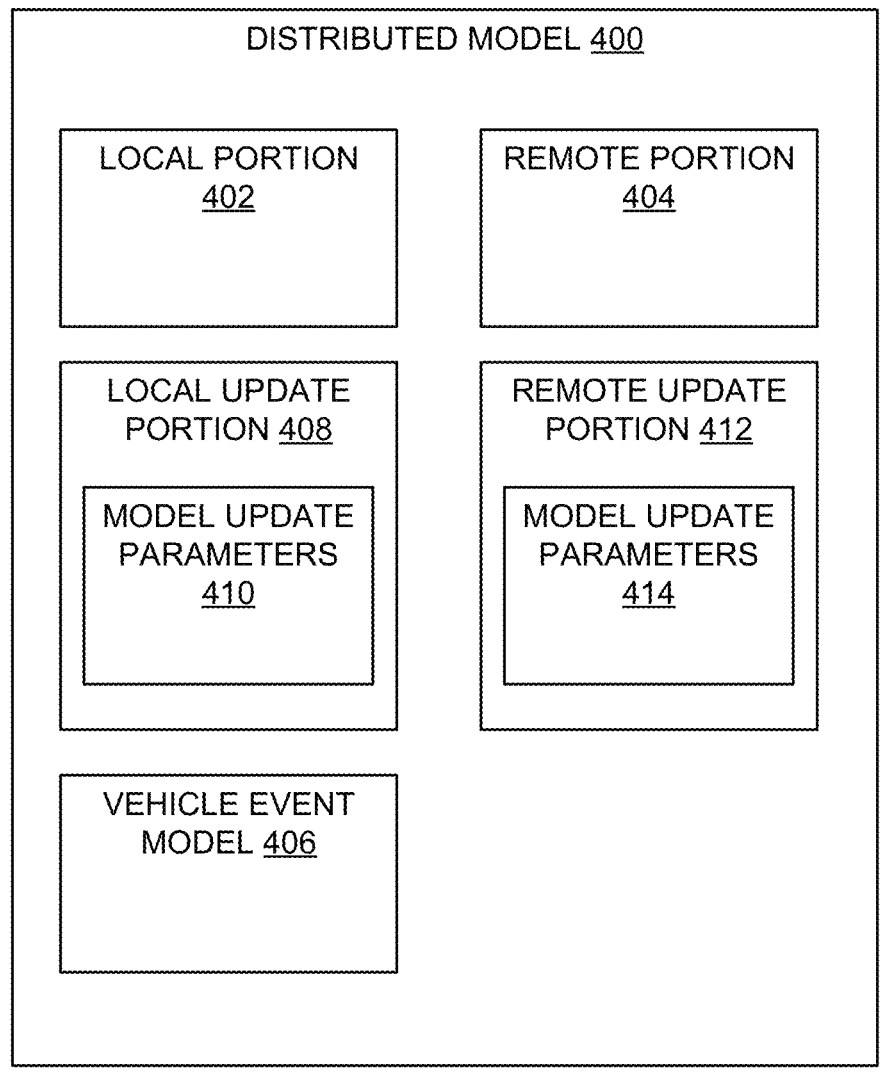
FIG. 4 illustrates a block diagram of a distributed model, in accordance with various embodiments.

FIG. 4 illustrates a block diagram of a distributed model 400, in accordance with various embodiments. As shown in FIG. 4, the distributed model 400 may include multiple portions that facilitate the generation of local output models and remote output models.

The distributed model 400 may include a local portion 402 that may facilitate the generation of a local output model based on collected vehicle event data. The local output model may include a modified version of the vehicle event data that may be transmitted to the remote node that may only allow for authorized nodes (e.g., the remote node) to reconstruct the vehicle event data. The local output model may include modified PII, such as blurred or removed faces in an image, for example.

The distributed model 400 may include a remote portion 404 that may facilitate the generation of a remote output model based on the received local output model. The remote output model may include a reconstructed version of the vehicle event data. The distributed model 400 may facilitate the modification and reconstruction of the vehicle event data between a local node and a remote node to maintain security of the vehicle event data and allow for efficient transmission of the vehicle event data across a network.

The distributed model 400 may allow for vehicle event data that includes PII to be transmitted from a first geographic region to a second geographic region securely to prevent the unauthorized access of the PII. A remote node can process the local output model to generate a remote output model that can reconstruct the vehicle event data.

The distributed model 400 can include a deep-learning machine learning model with multiple layers, where each layer includes one or more synthetic neurons. Each synthetic neuron may transform a vector of inputs (e.g., a set of input values) into a scalar output (e.g., a scalar output value), and can provide the scalar output to downstream layers in the distributed model. The transformation of each synthetic neuron can be any suitable multivariate-input, single-variable-output functional transformation (e.g., a linear transform, a nonlinear transform, etc.). Each layer can have any suitable number of synthetic neurons, and layers can have different numbers of synthetic neurons from each other layer or subsets of other layers. The deep learning model can include any of a supervised learning model, an unsupervised learning model, etc.

The distributed model 400 can include a vehicle event model 406 that may determine the types of vehicle events associated with vehicle event data (e.g., to classify vehicle event data). Classifying vehicle event data can include determining a type of vehicle event based on the vehicle event data, including a near-miss event, an accident event, a reckless driving event, a driver distraction event, and any other suitable event related to vehicle operation (e.g., driving). Any of the local portion 402 and remote portion 404 can include the vehicle event model.

The vehicle event model 406 can include a plurality of classifications. Each classification can represent a type of event depicted in the vehicle event data. For example, a first classification can include external vehicle environment data and a second classification can include driver behavior data. Each classification can include multiple characteristics/features that are indicative of the classification. For example, a classification of an external vehicle environment can include multiple characteristics, such as a detected image of a road or objects commonly outside of the vehicle (e.g., trees, other vehicles, pedestrians).

The distributed model 400 can inspect the vehicle event data and identify characteristics of the vehicle event data. For example, the local portion 402 of the distributed model 400 can determine that a set of vehicle event data includes characteristics common to an image of an external environment of the vehicle. The characteristics identified may be used in determining a classification of the vehicle event data.

The characteristics of the vehicle event data may be compared with characteristics of the classifications to determine the appropriate classification for the vehicle event data. In some embodiments, this comparison may include determining whether the characteristics match any classification within a threshold similarity. For example, the local portion 402 of the distributed model 400 may determine that the characteristics for the vehicle event data match a threshold number of characteristics common to a first classification to determine that the vehicle event data is to be classified as the first classification. The classification can be used in determining a vehicle action to take. For example, the distributed model 400 may use the first classification of the vehicle event data to narrow down the potential vehicle actions down to a few potential actions and determine an appropriate action from the few potential actions.

In some embodiments, the classification of the vehicle event data can be used to train the distributed model 400 to increase the accuracy in classifying other vehicle event data.

Outputs (e.g., local output models, remote output models) of the distributed model 400 can include a plurality of model update parameters 410, 414 (e.g., a set of gradients). The plurality of model update parameters 410, 414 may facilitate the changing of the output of each component of the model (e.g., the weights of individual neurons of the deep learning network, the connectivity of individual neurons of the deep learning network, etc.). The remote output models may include this set of model update parameters 410, 414, which are based on both the local processing and remote processing (e.g., processing by the local portion 402 and the remote portion 404 of the distributed model), but can additionally or alternatively omit the set of model update parameters 410, 414.

The distributed model 400 may perform processes iteratively for each collected datum. For example, in embodiments where the distributed model 400 is configured to training a distributed vehicle event model, an iteration of training can be performed for each piece of collected vehicle event data that includes local processing, local output transmission, remote processing of the local outputs to generate remote outputs and updating of the distributed model 400 based on the remote outputs. In some embodiments, the distributed model 400 may perform processes asynchronously (e.g., wherein data is collected, processed, transmitted, and utilized to update the distributed model 400 in batches) or with any other suitable temporal characteristics.

In some embodiments, the local portion 402 may be configured to remove PII from the collected vehicle event data so that the local output models do not include PII. The local model executing on the local computing node can inspect the vehicle event data to identify PII data and non-PII data. For example, processing vehicle event data that includes facial imagery can include providing the imagery to a local portion 402 of a distributed computer vision model, wherein the output of the local portion 402 does not include recognizable faces (e.g., wherein the facial features have been blurred, wherein the output includes extracted image features only from portions of the image in which no faces were present, etc.).

In some embodiments, the local portion 402 may include one or more layers of a neural network (e.g., a deep-learning neural network). The number of layers in the local portion 402 can be variable (e.g., varied in time, variable by geographic location, variable by jurisdiction, etc.) and/or fixed (e.g., predetermined, static, etc.). The number of layers can determine the degree to which PII can be extracted from the data; for example, a greater number of layers can produce outputs from which fewer personally-identifying features can be extracted, due to data manipulation (e.g., data transformation, data loss, etc.) that is performed at each layer (and/or each synthetic neuron of each layer). However, the number of layers corresponding to the local portion 402 may be minimized and determined based on a processing threshold, wherein the processing threshold is determined (e.g., on a location by location basis, on a model specific basis, etc.) according to an acceptable quantity (e.g., degree, amount, etc.) of PII in the outputs. A minimal number of layers (e.g., a single layer, between one and three layers, between one and five layers, etc.) in the local portion 402 of the distributed model 400 can reduce the volume (e.g., quantity, data size, etc.) of the local output models that are transmitted to the remote node, which can increase (e.g., exponentially) as the number of layers increases.

In some embodiments, locally processing the vehicle event data at the local computing device may include implementing the local portion 402 of the distributed model 400 to classify vehicle event data. The classification of vehicle event data performed by the local portion 402 of the distributed model 400 can be location specific, and can include classifying traffic events specific to a location (e.g., traffic operations such as lane changes and turns that are performed in a geographic or jurisdictional region where vehicles typically drive on the left side of the road or the right side of the road), classifying driver behaviors specific to a location (e.g., drivers in a specific location having a distraction threshold based on population level behaviors such as typically driving in a less distracted manner, and thus may have a lower threshold for distraction), and any other location-specific classification behaviors.

In some embodiments, the local portion 402 can be one of a plurality of local portion 402 of the distributed model, wherein each local portion 402 of the plurality of local portion 402 can be associated with a different location. In embodiments where the local and remote portion 404 each include neuron layers, the connectivity between the neurons of the remote portion 404 and the neurons of each local portion 402 is preferably identical, such that remote output models (e.g., including model update parameters 410, 414) can be propagated forward to each local portion 402 equivalently (e.g. to update the plurality of local portion 402). However, in similar examples, the connectivity between neurons of the remote portion 404 and neurons of each local portion 402 can differ (e.g., per local portion 402, per subsets of local portion 402, etc.) and/or have any other suitable connectivity.

The distributed model 400 may include a local update portion 408. The local update portion 408 may facilitate the local computing device updating the local portion 402 of the distributed model 400 based on the local output models. This may modify the local portion 402 of the distributed method in a location-specific manner. The local update portion 408 may differentiate the local portion 402 from other local portion 402 associated with other geographic locations than the first geographic location, in variations where a single remote portion 404 corresponds to a plurality of local portion 402 of the distributed model.

In some embodiments, the local update portion 408 may be configured to train the local portion 402 of the distributed model 400 using outputs of the local portion 402. For example, the outputs of the local portion 402 can include gradient values and training the local portion 402 can include correcting the weights associated with each synthetic neuron and/or synthetic neuron layer (e.g., of a CNN) by the gradients to improve classification performance of the local portion 402 (e.g., train the local portion 402).

The distributed model 400 may include a remote update portion 412. The remote update portion 412 may be configured to update any of the local portion 402 and the remote portion 404 of the distributed model 400 based on the remote output models. The remote update portion 412 may be configured to train the distributed model 400 based on the output of the remote portion 404, which includes processing performed by the local portion 402 (e.g., prior to transmission of the output of the local portion 402. The remote update portion 412 can train the distributed model 400 in a manner substantially similar to training of the local model, with the additional benefit of the processing performed by the remote portion 404 and without transferring PII from the first location to the second location.

In some embodiments, where the vehicle event data is provided as an output in the form of a gradient or other suitable model modification factor, the remote update portion 412 can include applying the gradient or model modification factor to the model to improve model performance. For example, the remote update portion 412 can be configured to train the distributed model 400 based on its own output (e.g., via bootstrapping). In another example, the remote update portion 412 can be configured to label the output of the distributed model 400 (e.g., via an automatic labeler, a manual labeler, etc.) and provide the labeled output as an input to the local portion 402 of the distributed model 400 in order to train the local portion 402.

Figure 5:
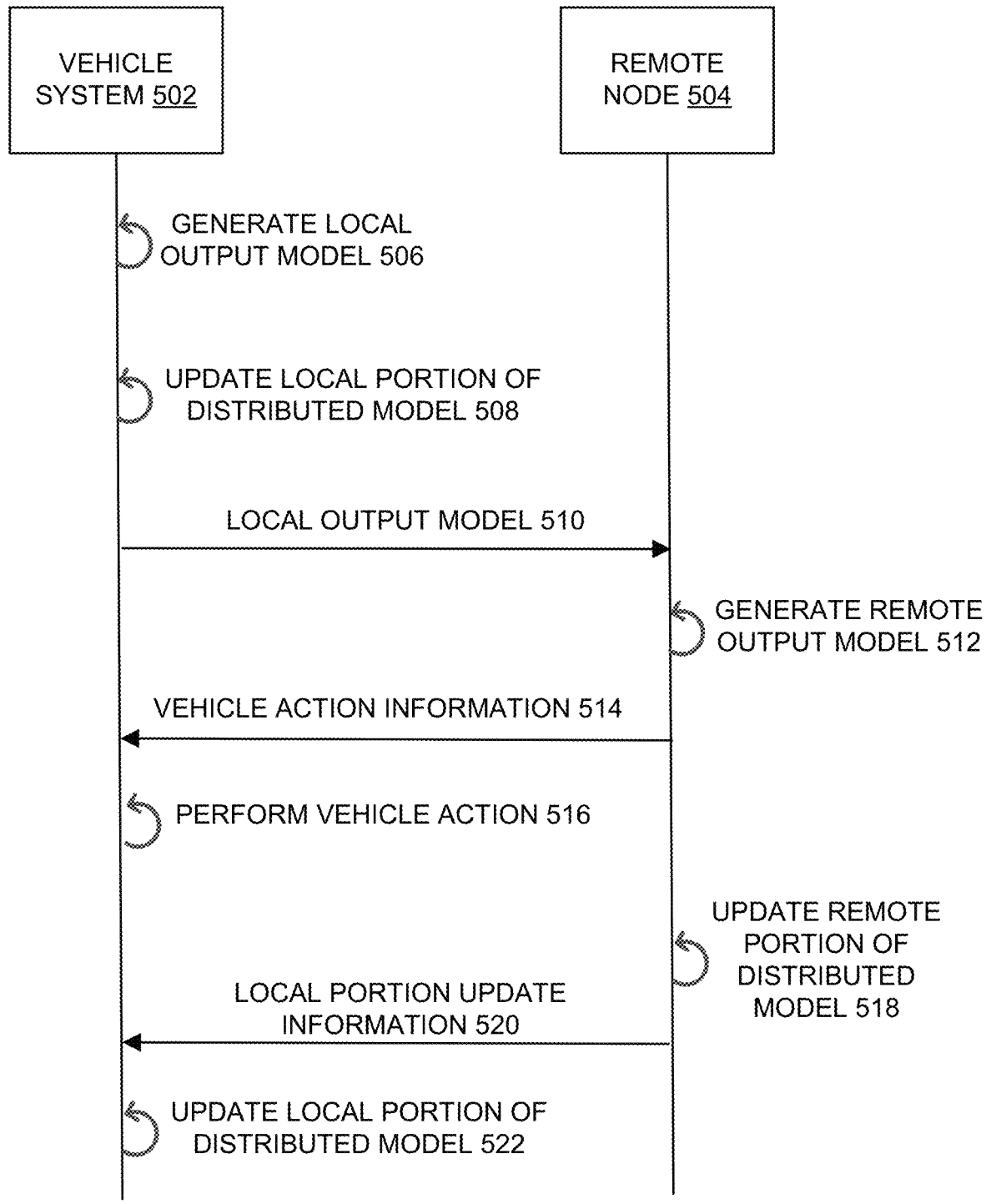
FIG. 5 illustrates a signaling process between a vehicle system and a remote node, in accordance with various embodiments.

FIG. 5 illustrates a signaling process between a vehicle system and a remote node, in accordance with various embodiments. As noted above, a vehicle system may collect a plurality of vehicle event data from a plurality of sensors. The vehicle system may generate a local output model 506 of the vehicle event data using a local portion of the distributed model. In some embodiments, this may include identifying PII and modifying the local output model to remove the PII portions of the local output model.

In some embodiments, the vehicle system may locally update the local portion of the distributed model 508. Updating the local portion may be based on the generated local output model.

The vehicle system may transmit the local output model 510 to the remote node. The local output model may be sent from a first geographic location to a second geographic location that is different than the first geographic location.

The vehicle system may compress the local output models prior to transmission. In embodiments that include collecting and processing image data, compressing can include any suitable video and/or image data compression scheme (e.g., spatial image compression, temporal motion compensation, lossy compression, lossless compression, interframe compression, intraframe compression, etc.). Compressing can also be performed on any suitable format of the local output models (e.g., sparse matrices of scalar values, dense matrices of scalar values, vector outputs, etc.).

The vehicle system may batch the local output models and transmit the batches of local output models. Batching can increase overall performance and/or speed (e.g., by reducing transmission overhead, by reducing transmission latency, etc.). In some embodiments, batching may be performed based on transmission bandwidth availability (e.g., in an ad hoc manner). In additional or alternative variations, batching may be performed according to a predetermined schedule (e.g., hourly, daily, biweekly, etc.).

The remote node may generate a remote output model 512 based on the local output model. The remote output model may include a reconstructed version of the vehicle event data. The remote node can identify a vehicle action to take based on inspecting the remote output model.

The remote portion of the distributed model may include one or more layers of a neural network (e.g., a deep-learning neural network). The number of layers in the remote portion can be variable (e.g., varied in time, variable by geographic location, variable by jurisdiction, etc.), exchanged between the local portion(s) and the remote portion (e.g., wherein the total number of layers is fixed and the number of layers divided between the local and remote portions is variable), and/or fixed (e.g., predetermined, static, etc.). The number of layers corresponding to the remote portion may be determined based on a processing threshold, wherein the processing threshold is determined (e.g., on a model specific basis, for any other suitable reason, etc.) according to a goal of the overall output of the distributed model (e.g., wherein the remote portion represents the final stage of data processing for a given iteration). The goal can be a classification (e.g., wherein a classification below a threshold probabilistic association with a given class or the failure to classify a datum would represent a failure to meet the processing threshold) or any other suitable output model.

In some embodiments, remotely processing the vehicle event data may include implementing the remote portion of the distributed model to classify vehicle event data. The classification of vehicle event data performed by the remote portion of the distributed model can be location agnostic, and can include classifying traffic events that are unspecific to a location (e.g., traffic operations such as swerves or rapid turns that are considered as such regardless of jurisdiction and/or geographic locations), classifying driver behaviors unspecific to a location (e.g., drivers behaving in generally reckless and unsafe manners, and thus subject to a generalized threshold for distraction), and any other non-location-specific classification behaviors.

In some embodiments, the remote portion can correspond to a plurality of local portions of the distributed model, wherein each local portion of the plurality of local portions can be associated with a different location. In examples wherein the local and remote portions each include neuron layers, the connectivity between the neurons of the remote portion and the neurons of each local portion may be identical, such that remote output models (e.g., including model update parameters) can be propagated forward to each local portion equivalently (e.g. to update the plurality of local portions). However, in similar examples, the connectivity between neurons of the remote portion and neurons of each local portion can differ (e.g., per local portion, per subsets of local portions, etc.) and/or have any other suitable connectivity.

The remote output models can include image features, parameter weights, gradients (e.g., image gradients, transform gradients, etc.), vehicle event classifications, and any other suitable outputs.

The remote node may send the vehicle action information 514 to the vehicle system. The vehicle action information may dictate an action to take in response to the vehicle event data collected.

The vehicle system may perform the vehicle action 516 based on receiving the vehicle action information. In some embodiments, at least some vehicle actions may be identified locally at the vehicle system. The distributed model may be implemented to assist in transferring and performing the vehicle action.

In some embodiments, performing a vehicle action can include controlling a vehicle based on the distributed model. For example, the output of the model can include vehicle object detection and classification and performing the vehicle action can include controlling the vehicle to maneuver with respect to the detected and classified objects. In another example, the output of the model can include determining driver behavior data (e.g., driver distraction, driver attentiveness, driver driving skill, etc.), and performing a vehicle action can include adjusting vehicle performance parameters (e.g., suspension stiffness, steering responsiveness, etc.) based on the driver behavior data determined as an output of the distributed model.

Determining a vehicle event (e.g., determining vehicle event data) can be based on the distributed model. For example, the distributed model can generate an output that indicates a single event type (e.g., a near-collision event, a swerve event, a driver distraction event, etc.), and performing a vehicle event can include combining the distributed output model with another datum (e.g., output of another distributed model, output of a local model, any other suitable output, etc.) to generate combined vehicle event data (e.g., a vehicle event made up of multiple types of vehicle events).

The remote node may update the remote portion of the distributed model 518 based on the generated remote output model. The remote node may transmit local portion update information 520 to the vehicle system. The vehicle system may update the local portion of the distributed model 522 based on the received local portion update information.

Figure 6:
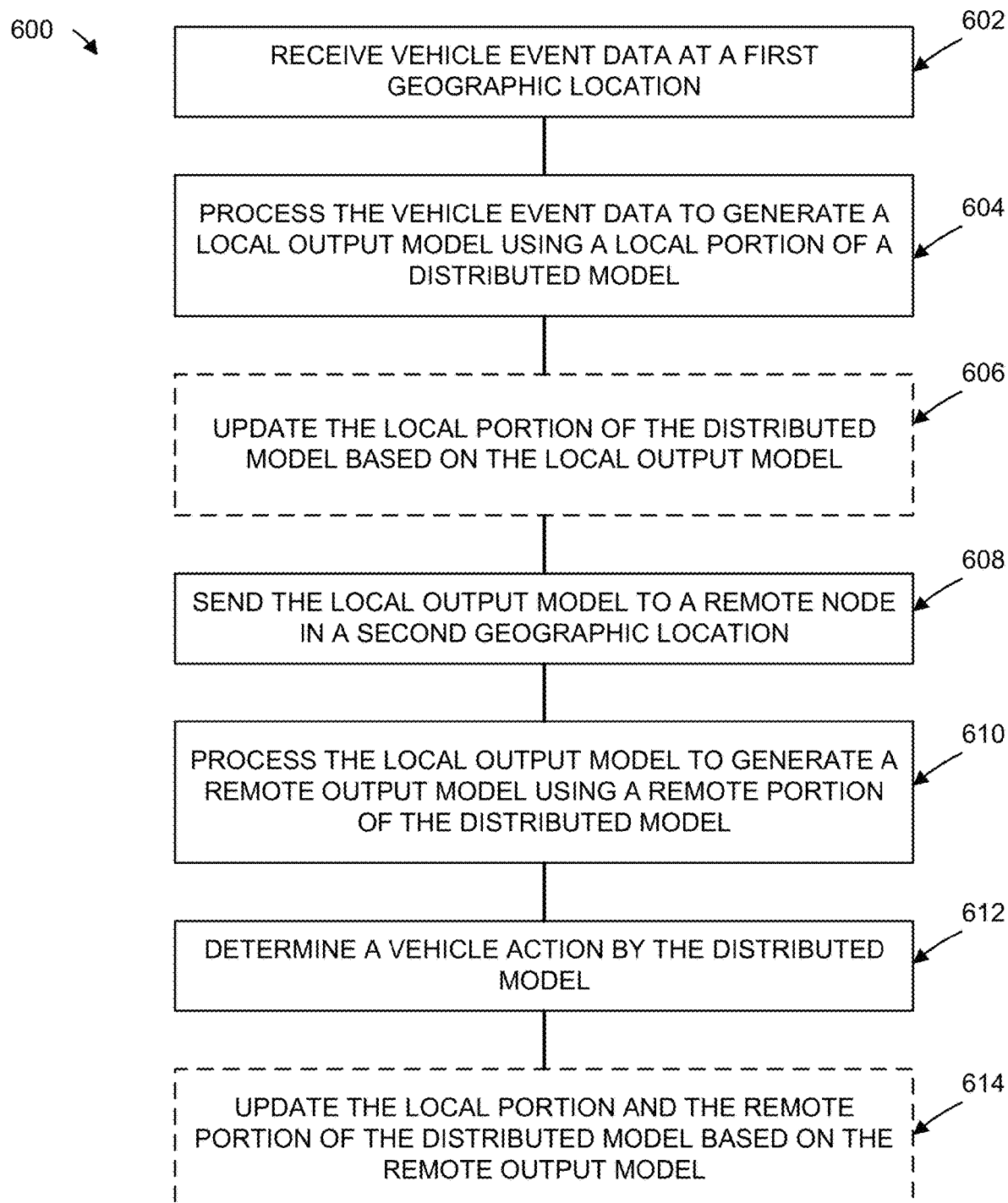
FIG. 6 illustrates a method to implement a vehicle action using a distributed model, in accordance with various embodiments.

FIG. 6 illustrates a method 600 to implement a vehicle action using a distributed model, in accordance with various embodiments. The distributed model may be distributed across the local portion associated with a local computing device onboard the vehicle and the remote portion associated with the remote node.

In some embodiments, the distributed model includes a plurality of layers. Each layer may be configured to extract a portion of the vehicle event data from the remote output model and generate a vector of input values from the extracted portion of the vehicle event data. Each layer may generate a set of scalar outputs from the vector of input values, wherein the scalar outputs are configured to be distributed across the plurality of layers, and wherein determining the vehicle action is based on inspecting the set of scalar outputs generated by each of the plurality of layers.

The method may include receiving vehicle event data at a first geographic location (block 602). The vehicle event data may be collected by a plurality of sensors. At least one sensor includes a set of internal sensors capturing vehicle event data of an interior environment of the vehicle and a set of external sensors capturing vehicle event data of an exterior environment of the vehicle, wherein implementing the vehicle action at the vehicle includes at least one of an external movement correction and an internal correction.

The method may include processing the vehicle event data to generate a local output model using a local portion of the distributed model (block 604). The local output model may represent a modified version of the vehicle event data that may only be accessed by a remote node using the remote portion of the distributed model. The local output model may facilitate the secure transfer of PII across different locations.

In some embodiments, at least a portion of the vehicle event data includes personally-identifiable information (PII), the PII includes information indicative of an individual. The vehicle may identify a first portion of the vehicle event data that includes PII and a second portion of the vehicle event data that does not include any PII. The vehicle may modify the first portion of the vehicle event data to remove any PII from the vehicle event data, wherein the modified version of the vehicle event data includes the first portion of the vehicle event data with PII removed and the second portion of the vehicle event data.

In some embodiments, the vehicle event data may be inspected to identify a set of characteristics of the vehicle event data. The set of characteristics of the vehicle event data may be compared against a plurality of classifications to determine that the set of characteristics of the vehicle event matches a first classification with a threshold similarity, the first classification indicative of the type of information included in the vehicle event data. The first classification may be included in the first local output model transmitted to the remote node, where determining the vehicle action is based on the reconstructed version of the vehicle event data included in the remote output model and the first classification.

In some embodiments, the method may include updating the local portion of the distributed model based on the local output model (block 606). In some embodiments, updating the local portion may include determining an accuracy of the first local output model generated from the vehicle event data and updating the local portion of the distributed model based on the determined accuracy of the first local output model.

The method may include sending the local output model to a remote node in a second geographic location (block 608). The second geographic location may be different than the first geographic location.

The method may include processing the local output model to generate a remote output model using a remote portion of the distributed model (block 610). The remote output model may include a reconstructed version of the vehicle event data.

In some embodiments, the remote node may receive a second local output model from a second local portion of the distributed model associated with the vehicle located in the second geographic region. The remote node may aggregate the first local output model and the second local output model at the remote node, wherein determining the vehicle action is based on inspecting the aggregated first local output model and second local output model.

The method may include determining a vehicle action by the distributed model (block 612). Based on the determined vehicle action, the vehicle action may be implemented at the vehicle.

In some embodiments, the remote node can identify a jurisdiction associated with the first geographic region to identify a set of jurisdiction-specific characteristics associated with the identified jurisdiction. The remote node can compare the reconstructed version of the vehicle event data included in the remote output model and the set of jurisdiction-specific characteristics associated with the identified jurisdiction, wherein determining the vehicle action is based on the set of jurisdiction-specific characteristics associated with the identified jurisdiction.

In some embodiments, the method may include updating the local potion and the remote portion of the distributed model based on the remote output model (block 614). In some embodiments, updating the local potion and the remote portion of the distributed model includes determining a first accuracy of the first local output model generated from the vehicle event data at the remote node and determining a second accuracy of the remote output model generated from the local first output model at the remote node. The remote node may update the remote portion of the distributed model based on the second accuracy of the remote output model. The remote node may transmit an update instruction to the vehicle, the update instruction providing instructions on updating the local portion of the distributed model based on the first accuracy of the first local output model.

Example Processing System

Figure 7:
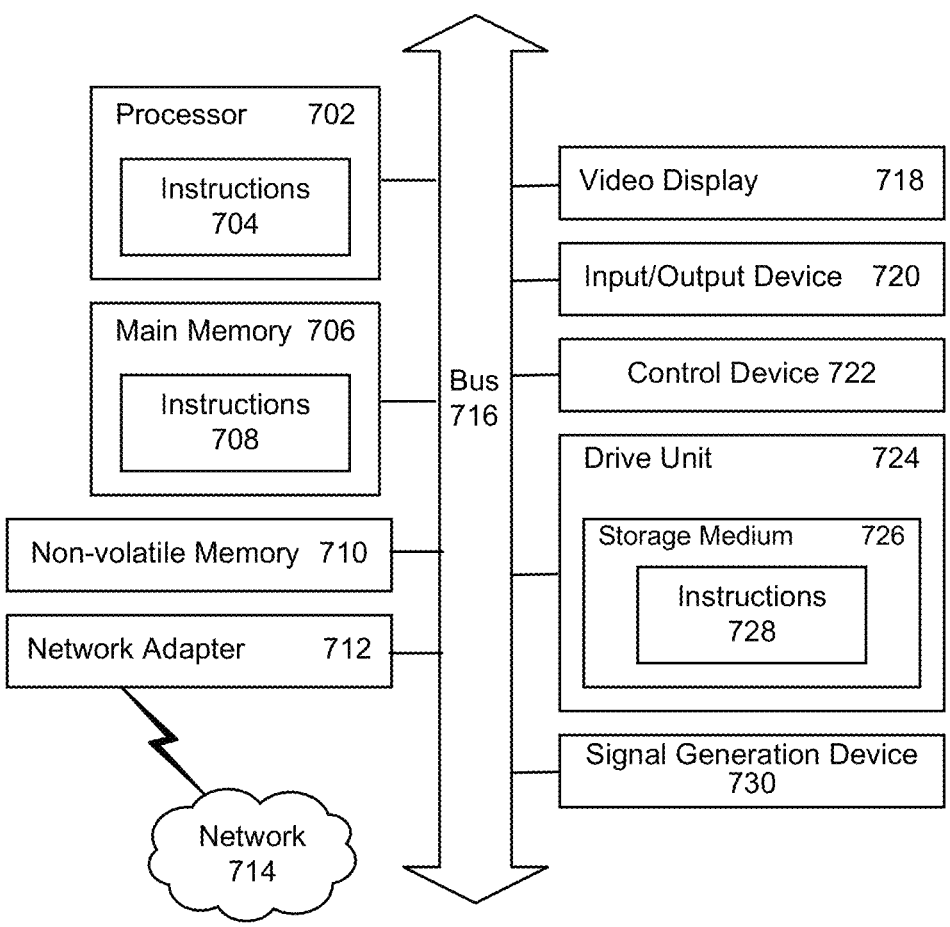
FIG. 7 is a block diagram that illustrates an example of a processing system in which at least some operations described herein can be implemented.

FIG. 7 is a block diagram illustrating an example of a processing system 700 in which at least some operations described herein can be implemented. As shown in FIG. 7, the processing system 700 may include one or more central processing units ("processors") 702, main memory 706, non-volatile memory 710, network adapter 712 (e.g., network interfaces), video display 718, input/output devices 720, control device 722 (e.g., keyboard and pointing devices), drive unit 724 including a storage medium 726, and signal generation device 730 that are communicatively connected to a bus 716. The bus 716 is illustrated as an abstraction that represents any one or more separate physical buses, point to point connections, or both connected by appropriate bridges, adapters, or controllers. The bus 716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 794 bus, also called "Firewire."

In various embodiments, the processing system 700 operates as part of a user device, although the processing system 700 may also be connected (e.g., wired or wirelessly) to the user device. In a networked deployment, the processing system 700 may operate in the capacity of a server or a client machine in a client-server network environment, or as a peer machine in a peer-to-peer (or distributed) network environment.

The processing system 700 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 700.

While the main memory 706, non-volatile memory 710, and storage medium 726 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 704, 708, 728) set at various times in various memory and storage devices in a computer, and that, when read and executed by one or more processing units or processors 702, cause the processing system 700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 710, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 712 enables the processing system 700 to mediate data in a network 714 with an entity that is external to the processing system 700 through any known and/or convenient communications protocol supported by the processing system 700 and the external entity. The network adapter 712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method comprising:
obtaining a vehicle event data from sensors of an on-board vehicle system mounted with a vehicle located within a first geographic region within an identified jurisdiction, the vehicle event data comprising first image data indicative of characteristics of an interior environment inside the vehicle, and second image data indicative of characteristics of an exterior environment of outside the vehicle;
generating a modified version of the vehicle event data; and
sending the modified version of the vehicle event data from the on-board vehicle system to a remote node located within a second geographic region;
wherein the first image data and second image data are provided by the on-board vehicle system, wherein the modified version of the vehicle event data comprises the second image data indicative of the characteristics of the environment outside the vehicle, and wherein a part of the first image data provided by the on-board vehicle system is removed or blurred in the modified version of the vehicle event data to remove personally-identifiable information in accordance with a limitation imposed by the identified jurisdiction.

2. The method of claim 1, wherein at least a portion of the vehicle event data includes personally-identifiable information (PII), the PII includes information indicative of an individual.

3. The method of claim 2, wherein the act of generating the modified version of the vehicle event data comprises: identifying a first portion of the first image data that includes PII and a second portion of the first image data that does not include any PII; and modifying the first portion of the first image data to remove any PII from the first image data, wherein the modified version of the vehicle event data includes the first portion of the first image data with PII removed and the second portion of the first image data.

4. The method of claim 1, further comprising: inspecting the vehicle event data to identify a set of characteristics of the vehicle event data; and comparing the set of characteristics of the vehicle event data against a plurality of classifications to determine that the set of characteristics of the vehicle event matches a first classification with a threshold similarity.

5. The method of claim 4, further comprising transmitting the first classification to the remote node.

6. The method of claim 5, wherein the first classification, the first image data, and the second image data are transmitted in association with each other to the remote node.

7. The method of claim 5, wherein the first classification, the first image data, and the second image data are transmitted together in a form of a model to the remote node.

8. The method of claim 5, further comprising determining a vehicle action based on a reconstructed version of the vehicle event data and the first classification.

9. The method of claim 1, wherein the sensors comprise a set of internal sensors sensing the characteristics of the interior environment of the vehicle and a set of external sensors sensing the characteristics of the exterior environment of the vehicle.

10. The method of claim 1, further comprising: generating a first local output model by a first local portion of a distributed model based on the modified version of the vehicle event data; and generating a remote output model based on the first local output model using a remote portion of the distributed model, the remote output model including a reconstructed version of the vehicle event data.

11. The method of claim 10, wherein the distributed model includes a plurality of layers, each layer is configured to: extract a portion of the vehicle event data from the remote output model; generate a vector of input values from the extracted portion of the vehicle event data; and generate a set of scalar outputs from the vector of input values, wherein the scalar outputs are configured to be distributed across the plurality of layers.

12. The method of claim 10, further comprising: receiving a second local output model from a second local portion of the distributed model; and aggregating the first local output model and the second local output model at the remote node.

13. The method of claim 10, further comprising: identifying the identified jurisdiction associated with the first geographic region; inspecting a listing of jurisdictions to identify a set of jurisdiction-specific characteristics associated with the identified jurisdiction, wherein the jurisdiction-specific characteristics comprise traffic laws; and comparing the reconstructed version of the vehicle event data included in the remote output model and the set of jurisdiction-specific characteristics associated with the identified jurisdiction.

14. The method of claim 10, further comprising: determining a first accuracy of the first local output model generated from the vehicle event data; determining a second accuracy of the remote output model generated from the first local output model; updating the remote portion of the distributed model based on the second accuracy of the remote output model; and transmitting an update instruction to the vehicle, the update instruction providing instructions on updating the first local portion of the distributed model based on the first accuracy of the first local output model.

15. The method of claim 10, further comprising determining a vehicle action to be implemented, wherein the vehicle action is determined based on the reconstructed version of the vehicle event data.

16. The method of claim 1, further comprising: generating a first local output model based on the modified version of the vehicle event data: determining an accuracy of the first local output model generated based on the modified version of the vehicle event data; and updating a local portion of the distributed model based on the determined accuracy of the first local output model.

17. A system comprising: an on-board vehicle system for a vehicle, the on-board vehicle system configured to:
   obtain vehicle event data from sensors of the on-board vehicle system mounted with the vehicle located within a first geographic region within an identified jurisdiction, the vehicle event data comprising first image data indicative of characteristics of an interior environment in the vehicle, and second image data indicative of characteristics of an exterior environment of outside the vehicle;
   generate a modified version of the vehicle event data; and
   send the modified version of the vehicle event data from the on-board vehicle system to a remote node located within a second geographic region;
   wherein the first image data and second image data are provided by the on-board vehicle system, wherein the modified version of the vehicle event data comprises the second image data indicative of the characteristics of the environment outside the vehicle, and wherein a part of the first image data provided by the on-board vehicle system is removed or blurred in the modified version of the vehicle event data to remove personally-identifiable information in accordance with a limitation imposed by the identified jurisdiction.

18. The system of claim 17, further comprising: the remote node including a remote portion of a distributed model, the remote node configured to: receive a local output model from the vehicle, the local output model being based on the modified version of the vehicle event data; and generate a remote output model based on the received local output model using the remote portion of the distributed model, the remote output model including a reconstructed version of the vehicle event data.

19. The system of claim 18, the remote node configured to: identify the identified jurisdiction associated with the first geographic region; inspect a listing of jurisdictions to identify a set of jurisdiction-specific characteristics associated with the identified jurisdiction, wherein the jurisdiction-specific characteristics comprise traffic laws; and compare the reconstructed version of the vehicle event data included in the remote output model and the set of jurisdiction-specific characteristics associated with the identified jurisdiction.

20. The system of claim 18, the remote node configured to: compare any of the local output model and the remote output model with a plurality of model update parameters indicating gradients to determine an accuracy between any of the local output model and the remote output model and the plurality of model update parameters; and update at least one of the local output model and the remote output model based on the determined accuracy between any of the local output model and the remote output model and the plurality of model update parameters.

21. The system of claim 17, wherein the on-board vehicle system is configured to determine a first classification based on the vehicle event data, and to transmit the first classification to a remote node.

22. The system of claim 21, wherein the on-board vehicle system is configured to transmit the first classification, the first image data, and the second image data in association with each other to the remote node.

23. The system of claim 21, wherein the on-board vehicle system is configured to transmit the first classification, the first image data, and the second image data together in a form of a model to the remote node.

* * * * *